United States Patent [19]

Gryn

[11] 4,263,813

[45] Apr. 28, 1981

[54] ROTAMETER-TYPE FLOWMETER WITH MEANS FOR LINEARIZING OUTPUT READINGS

[75] Inventor: Felix J. Gryn, Hatfield, Pa.

[73] Assignee: Emerson Electric Co., St. Louis, Mo.

[21] Appl. No.: 59,532

[22] Filed: Jul. 23, 1979

[51] Int. Cl.³ .............................................. G01F 1/24
[52] U.S. Cl. .................................................. 73/861.56
[58] Field of Search .................... 73/209, 210, 432 A,
73/DIG. 5, 861.56; 310/103

[56] References Cited

U.S. PATENT DOCUMENTS

| 3,164,989 | 1/1965 | Busillo et al. | 73/209 |
| 3,315,523 | 4/1967 | Conkling | 73/209 |
| 3,977,248 | 8/1976 | Metzger | 73/209 |

Primary Examiner—Herbert Goldstein
Attorney, Agent, or Firm—Polster, Polster and Lucchesi

[57] ABSTRACT

A rotameter-type flowmeter having a rotatable follower magnet which is magnetically coupled to a float magnet which in turn is responsive to the flow rate of the fluid which is to be measured. A calibration magnet is provided which is selectively movable in an arcuate track relative to the rotary axis of the follower magnet so as to alter the magnetic coupling between the follower magnet and the float magnet in such manner as to linearize (i.e., normalize) the output of the flowmeter. In addition, the calibration magnet is movable longitudinally with respect to the follower magnet so as to adjust the scale span of the flowmeter.

7 Claims, 8 Drawing Figures

ROTAMETER-TYPE FLOWMETER WITH MEANS FOR LINEARIZING OUTPUT READINGS

BACKGROUND OF THE INVENTION

This invention relates to a rotameter-type flowmeter, and more particularly to such a flowmeter having means for adjusting the linearity (i.e., means for normalizing) of the output readings of the flowmeter.

Generally, a rotameter-type flowmeter includes a vertically disposed rotameter tube of circular cross section through which flows the fluid whose flow rate is to be measured. This rotameter tube is tapered typically with its smallest diameter at its bottom. A float is disposed within the rotameter tube and is movable axially therewithin in response to changes in flow rate through the rotameter tube —the higher the flow rate, the higher the flow rises within the rotameter tube. Of course, as the float rises higher in the tapered rotameter tube, the flow area between the walls of the rotameter tube and the float gets progressively larger. A magnet is operably movable with the float. This float magnet may be incorporated in the float or it may be remotely located from the float, but operatively coupled thereto by means of an extension rod or the like. A magnetic follower is mounted adjacent the float magnet and it is magnetically coupled to the float magnet so that it moves in response to movement of the float (i.e., in response to changes in the flow rate of the fluid).

As shown in the co-assigned U.S. Pat. No. 3,535,932, and in U.S. Pat. No. 3,065,635, the follower magnet is an elongate helical magnet disposed generally parallel to the path along which the float magnet moves (i.e., beside the rotameter tube). This helical follower magnet is journalled in suitable bearings so as to rotate freely about its longitudinal axis. A pointer is carried by the follower magnet. In operation, the leading edge of the helical follower magnet is continuously attracted to the float magnet. Thus, as the float magnet moves longitudinally within the rotameter tube, the helical follower magnet rotates about its longitudinal axis and the pointer is calibrated to indicate the flow rate of the fluid flowing through the flowmeter.

In another type of rotameter-type flowmeter, such as is shown in U.S. Pat. No. 3,315,523, a follower magnet in the shape of a disk is mounted on a shaft with the latter being rotatable about its longitudinal axis. Generally, the axis of the shaft on which the follower magnet is mounted is perpendicular to the path along which the float magnet is movable. The disk follower magnet is magnetically coupled to the float magnet and it is rotatable with its shaft in response to movement of the float magnet along its path. The shaft carrying the follower magnet also carries a pointer movable relative to a scale so as to indicate flow rate.

Generally, rotameter-type flowmeters, such as those described above, have worked well. These flowmeters are in general unaffected by vibration, extreme ambient temperature conditions, and they operate reliably in dirty or corrosive environments. However, a long standing problem has been associated with these flowmeters, viz, a non-linear relationship between the actual flow rate and the movement of the pointer. More particularly, the output of prior art rotameter-type flowmeters was found to be non-linear due to the geometry (i.e., the shape) of the metering float and the hydraulic characteristics of the fluid being metered. This nonlinearity would show itself as a bow-shaped curve, generally as is shown by the solid line curve in FIG. 6, when the float travel position is plotted as a percentage of full scale flow rate. For example, the linear deviation of a conventional rotameter-type flowmeter might be 7% of its full scale reading at a float position of 50% of its full scale travel and may have no deviation at its 0% and 100% float travel positions.

Heretofore, at least two different schemes were proposed to linearize or normalize this non-linearity problem. As shown in the above-noted U.S. Pat. No. 3,535,932, a non-magnetic (e.g., aluminum) plate was disposed adjacent the helical follower magnet. Then, a number of magnetic flux diverting plates were secured in place on the non-magnetic plate adjacent the helical follower magnet at locations corresponding to points of deviation between the actual and linear (or normal) output curves of the flowmeter. By positioning the flux diverting plates on either side of the follower magnet, depending on whether while the deviation from the linear curve is positive or negative, it was possible to correct each deviation more or less independently so that the actual and linear outputs of the flowmeter were essentially the same.

However, this prior art system required that the actual output characteristics of each flowmeter be established independently and that the number of and the location of the flux diverting plates be individually determined while calibrating each flowmeter. Also, this linearizing technique required that each flux diverting plate be secured in position on the non-magnetic plate in its respective position as determined during calibration. This, of course, required considerable time of skilled instrument calibration technicians and resulted in considerable additional labor costs.

In U.S. Pat. No. 3,977,248, another technique for linearizing a rotameter-type flowmeter is disclosed. In this patent, a rotary disk follower magnet is disclosed which has a weight eccentrically mounted on the follower magnet shaft. This weight is positioned angularly relative to an indicator needle (e.g., a pointer) also carried by the shaft so that the moment of the eccentric weight compensates for the hydraulic characteristics of the flowmeter and thus linearizes the flowmeter output. As disclosed in this prior patent, the eccentric mass is carried on a threaded stud affixed to and rotatable with the follower magnet shaft. To calibrate the flowmeter, it is necessary to select a mass of appropriate weight and to thread the mass radially inwardly or outwardly on the threaded shaft stud so as to apply the desired moment on the shaft.

Among the many objects and features of the present invention may be noted the provision of an improved rotameter-type flowmeter, generally as described above, in which the output indications of the flowmeter may be readily calibrated (or adjusted) to be substantially linear;

The provision of such a flowmeter in which the magnet coupling between the float magnet of the follower magnet may be readily varied so as to adjust the position of the pointer relative to the float position in such manner as to be the equivalent of the degree of non-linearity of the hydraulic characteristics of the flowmeter;

The provision of such a flowmeter in which the zero positions, scale span, and linearity of the output of the flowmeter can be readily set to correspond to the hydraulic characteristics of a flowmeter or fluid;

The provision of such a flowmeter which utilizes a single scale and transmitting cam for a wide range of non-linear flow characteristics within a given range of fluid viscosity;

The provision of such a flowmeter in which the magnetic coupling between the float and the follower magnets is of sufficient strength so as to provide adequate force or stiffness as to effectively operate various flowmeter transmitters and so as to hold an indicator at any desired position;

The provision of such a flowmeter which utilizes common scales and transmitting cams and which is capable of measuring flow rates of various fluids; and The provision of such a flowmeter which is more reliable and accurate than other prior art flowmeters, particularly prior non-linearized flowmeters, and which may be more readily and expensively calibrated in prior normalized (or linearized) rotameter-type flowmeters.

Other objects and features of this invention will be in part apparent and in part pointed out hereinafter.

SUMMARY OF THE INVENTION

This invention, briefly stated, relates to a rotameter-type flowmeter having a flow passage through which flows the fluid whose flow rate is to be measured. A float is disposed within this flow passage and is axially movable therewithin along a predetermined path in response to the rate of flow of fluid through the flow passage. A float magnet is movable in response to the flow of the fluid through the flow passage. A follower magnet is provided proximate the path of the movable float magnet. The follower magnet is rotatable about an axis in response to movement of the float magnet along its path and indicator means is provided which is operable by the follower magnet upon rotation thereof. Specifically, the improvement of this invention relates to a calibration magnet disposed proximate the follower magnet so that the magnetic flux of the calibration magnet has a substantial effect on the movement of the follower magnet in response to movement of the float magnet. The calibration magnet is selectively movable along a path in a plane generally perpendicular to the axis of rotation of the follower magnet so as to permit adjustment of the linearity of the flowmeter. Additionally, means is provided for locking or securing the calibration magnet in a desired position at any point along its path.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
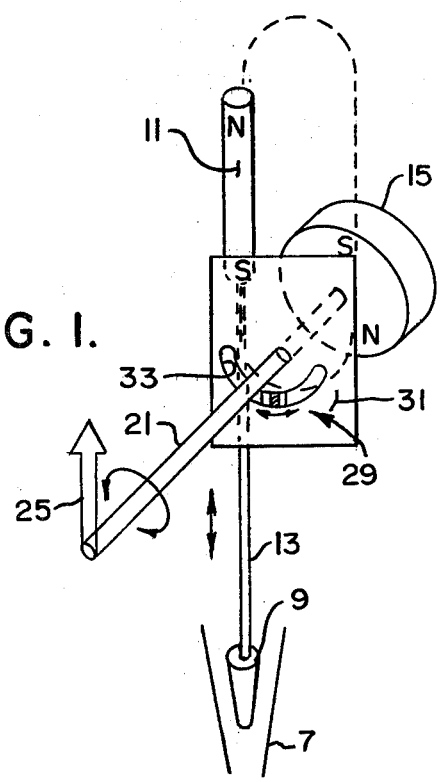
FIG. 1 is a diagrammatic perspective view of a rotameter-type flowmeter of the present invention.
Figure 2:
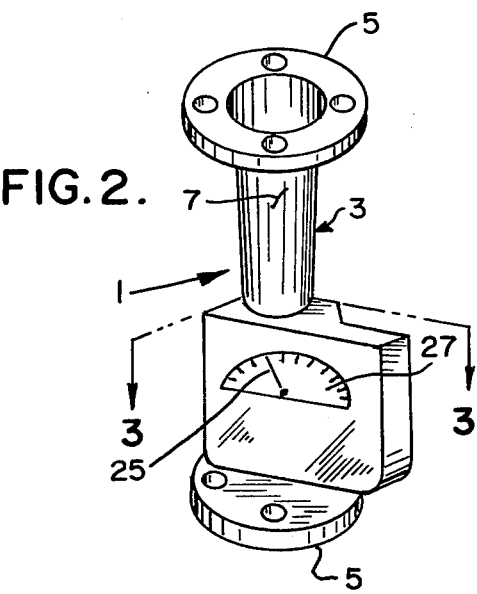
FIG. 2 is a perspective view of a through-flow type rotameter flowmeter including an indicator console.
Figure 3:
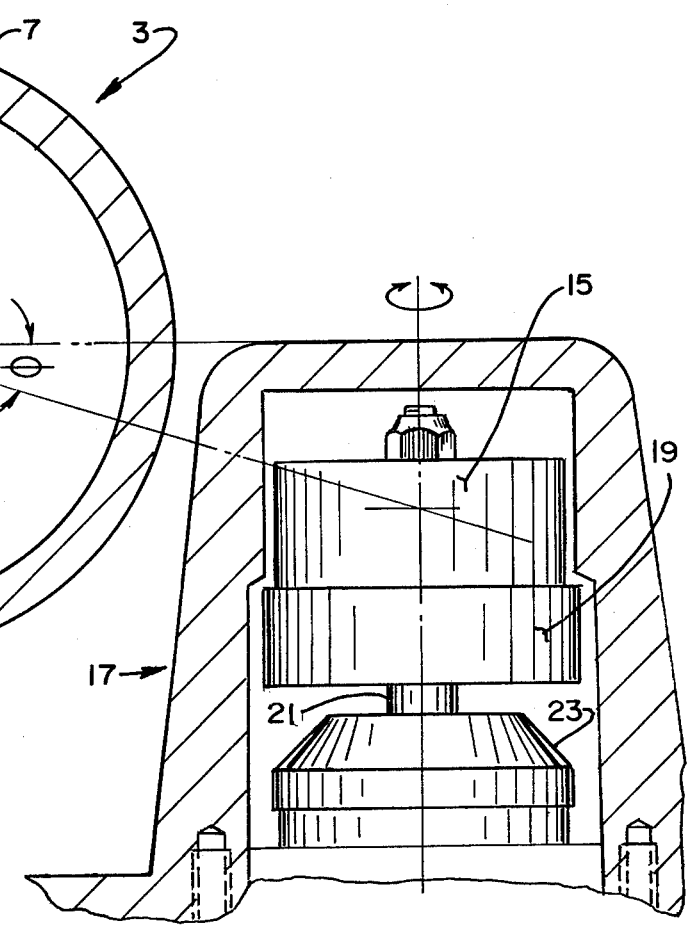
FIG. 3 is an enlarged horizontal cross sectional view taken along line 3—3 of FIG. 2 illustrating in cross section the rotameter tube of the flowmeter, a float magnet movable within the rotameter tube in response to the flow rate of fluid therethrough, and a rotary follower magnet magnetically coupled to and movable in response to movement of the float magnet.

Referring now to FIG. 2, a rotameter-type flowmeter is indicated in its entirety at 1 and is shown to comprise a meter body 3 having standard pipe flanges 5 at its end so that it may be readily bolted in place in a flow pipe system. Flowmeter body 3 has a circular cross section rotameter tube 7 (see FIG. 1) extending therethrough through which flows the fluid whose flow rate is to be measured. As is shown best in FIG. 1, rotameter tube is tapered along its length with its smaller end at its bottom. A float 9 is disposed within the rotameter tube and is axially movable therewithin in response to the rate at which fluid is flowing through the meter body. A float magnet 11 is operatively associated with the float 9 and is movable therewith in response to movement of the float. As shown best in FIG. 1, float magnet 11 is remotely located from the float and is connected thereto by means of a float rod 13. Further, the float magnet is disposed within the rotameter tube. It will be understood, however, that the float magnet could be incorporated in the float. Also, the float magnet may be operatively coupled to the float and located outside of the rotameter tube.

Figure 5:
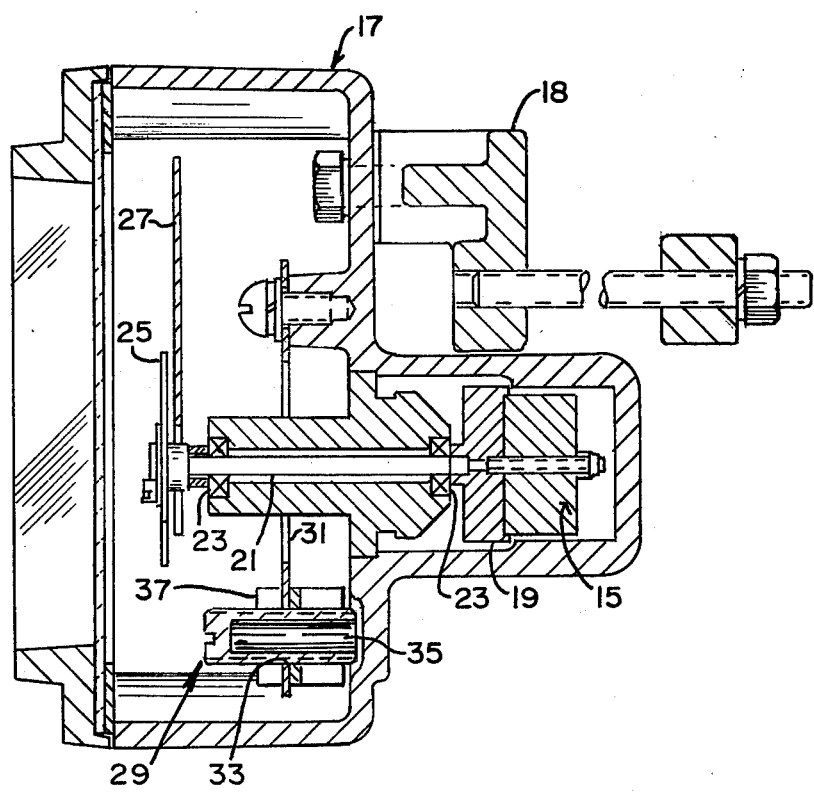
FIG. 5 is a cross sectional view of the indicator console taken along line 5—5 of FIG. 4 so as to illustrate the follower magnet and the linearizing means.

As indicated at 15, a follower magnet is provided in close proximity to the path along which float magnet 11 is movable so as to be magnetically coupled to the float magnet and to be movable in response to movement of the float magnet thereby to indicate a change in the position of the float magnet and thus to indicate a change in the flow rate of the fluid flowing through the flowmeter. As shown, the follower magnet is outside the rotameter tube and is disposed within a non-magnet indicator housing 17. Housing 17 is mounted on meter body 3 by means of a clamping yoke 18 (see FIG. 5). Follower magnet 15 is a disk magnet and is mounted in a holder 19 which in turn has a shaft 21 secured thereto in coaxial relation with the follower magnet. Shaft 21 is journalled in suitable bearings 23 supported by housing 17 so as to be freely rotatable about is longitudinal axis in response to rotation of the follower magnet, such as is caused by a shift in position of float magnet 11. Shaft 21 extends forwardly in generally horizontal direction from follower magnet 15 and carries a pointer of indicator 25 thereon for indicating the flow rate of the fluid flowing through flowmeter 1 on an arcuate scale 27 adjacent the tip of the pointer. In addition to housing follower magnet 15 and scale 27 as heretofore disclosed, the indicator assembly may also include means (not shown) for transmitting a signal corresponding to the indicated flow rate to a receiving station (also not shown) remote from the flowmeter. For example, such a transmitter may be pneumatically or electrically operated so as to send a signal to a remote display or the like. In any event, flowmeter 1, as above described, is essentially conventional and is well known to those skilled in the flowmeter art.

Figure 6:
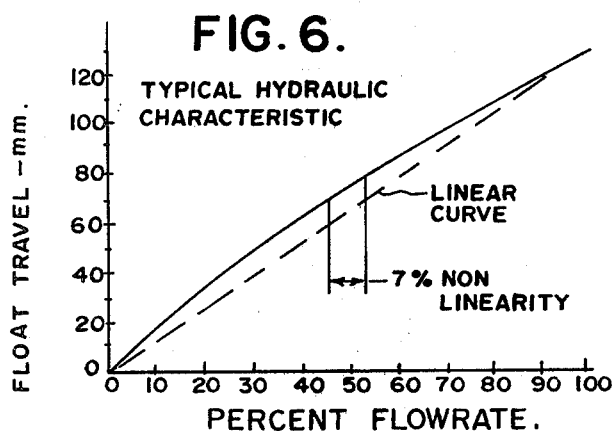
FIG. 6 is a plot of the typical hydraulic characteristics of a rotameter-type flowmeter as a function of float travel versus percentage of flow rate through the flowmeter with the linear curve being illustrated in dotted lines and with the actual output curve being illustrated in solid lines.

As shown in FIG. 6, the hydraulic characteristics of the fluid flowing through a typical rotameter-type flowmeter, the geometry of the float, and the geometry of the rotameter tube tend to result in a bow-shaped curve when float travel is plotted as a function of the percentage of full scale flow rate. The maximum deviation from a truly linear output (as shown by the dotted straight line in FIG. 6) tends to occur at about 50% of the full flow capacity of the flowmeter. As shown in FIG. 6, a typical prior art rotameter-type flowmeter may have about a 7% maximum deviation at 50% of the maximum flow capacity of the meter. As also as readily seen in FIG. 6, virtually no deviation from the linear output is present at the zero and full scale flow rates of the flowmeter. Of course, it would be highly desirable if the actual measured output of the flowmeter was substantially coincident with the linear curve (as shown by the dotted lines) in FIG. 6.

In accordance with this invention, means, as generally indicated at 29, is provided for adjusting or calibrating the output of a rotameter-type flowmeter so as to be substantially linear. More specifically, means 29 changes the magnetic coupling between float magnet 11 and follower magnet 15 (or the position of pointer 25) so as to enable compensation in the flowmeter for non-linear variations in the hydraulic characteristics of the flowmeter (i.e., the non-linear variations between flow rate and the actual float position). Additionally, calibration means 29, separate from its above-stated capability of linearizing the output of the flowmeter, also enables adjustment of the scale span of the flowmeter.

Figure 4:
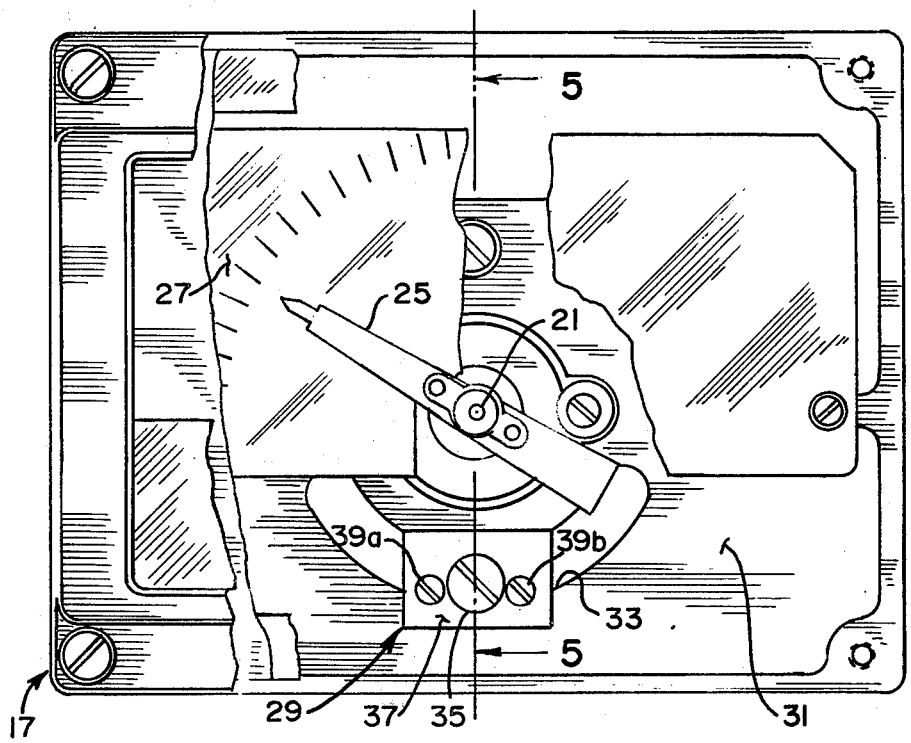
FIG. 4 is an enlarged view of a portion of the indicator console illustrated in FIG. 2 with a portion thereof broken away so as to illustrate a pointer carried by and movable with the follower magnet and means of this invention for normalizing or linearizing the output of the flowmeter.

More specifically, calibration or adjustment means 29 comprises a plate 31 mounted within housing 17 and at least in part surrounding shaft 21 and being generally perpendicular to the longitudinal horizontal axis of the shaft. Plate 31 has an arcuate slot 33 therein with the center of curvature of this slot being generally coincident with the longitudinal axis of shaft 21. A permanent magnet 35 is thereby mounted in a holder 37 which in turn is slidably carried in slot 33 so that the holder together with the magnet may be relatively moved in the arcuate slot to any desired position therealong thus enabling linearizing of the output of the flowmeter. Holder 37 includes a pair of clamping screws 39a, 39b (FIG. 4) which may be selectively loosened so as to permit movement of the holder 37 together with magnet 35 in generally circular relation to shaft 21 and to follower magnet 15 and to be securely clamped (i.e., locked) to plate 31 in any desired rotational position relative to the follower magnet or the follower magnet shaft. It will be appreciated that calibration magnet 35 constitutes a bias magnet whose magnetic field interacts with the magnetic field of the follower magnet and with the magnetic field of the float magnet 11 (i.e., the calibration magnet changes the magnetic coupling between the float and follower magnet) so as to create a non-linear change in the magnetic coupling between the float magnet and the follower magnet generally of the same magnitude but of opposite direction (i.e., positive or negative) as the non-linearity of the hydraulic characteristics of the flowmeter so that the two non-linearities effectively cancel one another and thus result in a substantially linear or normalized relation between the position of float 9 and the percentage of full scale reading on scale 27 by pointer 25.

As noted above, in addition to linearizing the output of flowmeter 1, calibration means 29 also enables the adjustment of the full-span readings of the flowmeter. In other words, in certain flowmeter calibrations, full scale movement of float 11 may be 120 mm. However, in other calibrations of the same flowmeter (i.e., for use with other fluids) a full-scale reading on scale 27 may require a float travel of, for example, of about 130 mm. In order to accomplish this change of scale span, calibration magnet 35 is threaded in its holder 37 for movement in a direction generally parallel to the axis of shaft 21 either toward or away from follower magnet 15.

The procedure or steps for linearizing or calibrating a rotameter-type flowmeter 1 of the present invention which incorporates calibration means 29 will now be herein explained in detail. First, the flowmeter is adjusted so that with no flow therethrough the pointer 21 indicates zero flow on scale 27 and so with the maximum flow rate of fluid flowing through the flowmeter the pointer indicates 100% of the full scale flow rate. This may be accomplished by threadably running calibration magnet 35 in or out of its holder 37 so as to vary the distance between the follower and calibration magnets. In this manner the zero and full scale positions of the flowmeter are determined. Then, float 9 and float magnet 11 are positioned in their respective midscale positions (i.e., the float is moved to its 50% float travel position) and clamping screws 39a, 39b are loosened so as to enable holder 37 together with calibration magnet 35 to be selectively shifted in arcuate slot 33 in generally circular relation to follower magnet 15 (or to shaft 21) thereby to change the bias or interaction of the magnetic field of the calibration magnet on the magnetic coupling between float magnet 11 and follower magnet 15. Holder 37 and calibration magnet 35 are then moved in arcuate slot 33 until pointer 25 points to the proper indicia on scale 27 corresponding to the linear position of float 9 (i.e., the 50% full scale position). The zero and full scale span is then rechecked and recalibrated if necessary.

Figure 7:
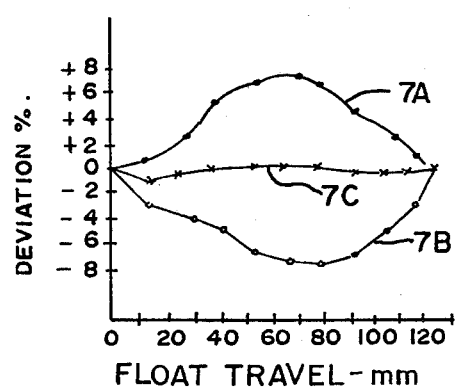
FIG. 7 is a plot of the maximum positive and negative deviation of the actual hydraulic characteristics of a flowmeter from a linear (straight line) output versus a float travel with the linearized output of the flowmeter of the present invention also being depicted.

Referring now to FIG. 7, the effect of adjusting calibration magnet 35 in arcuate slot 33 is shown. Plot 7A represents the maximum positive deviation obtainable in flowmeter 1 with calibration magnet 35, and plot 7B represents the maximum negative deviation. As shown, the maximum positive deviation by adjustment of calibration magnet 35 is about 8% and the maximum negative deviation is about 7%. As shown by plot 7C in FIG. 7, with calibration magnet 35 properly adjusted in arcuate slot 33, a nearly linear output of meter 1 is obtained. It will be particularly noted that with plate 31, adjacent arcuate slot 33, inscribed with a scale corresponding to a a calibration with the position of calibration magnet 35 set to zero non-linearity could be used by virtuslly any similar flow characteristic having a flow deviation of about 7% from scale 27 on the flowmeter.

Figure 8:
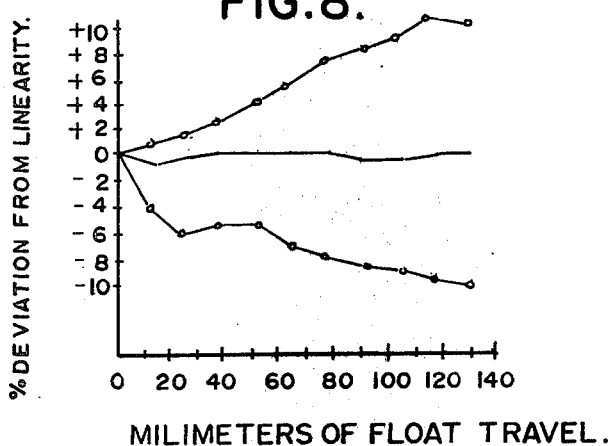
FIG. 8 is a plot of deviation versus float meter travel illustrating the capability of the means of this invention for linearizing the output of the flowmeter and for varying the full and zero scale span of the flowmeter.

FIG. 8 illustrates the capability of means 29 for adjusting the span of flowmeter 1 up to 10 of the full scale span. The capability is particularly important when, during calibration it is found that the required field flow rate of the meter being calibrated occurs at a float position in excess of 100% of the usual full flow float position. By threading calibration magnet 35 in and out of its holder 37 (i.e., moving it toward or away from follower magnet 15), the full scale span of the indicator may be selectively varied up to about 10%. For example, if the full scale float travel of a flowmeter is about 120 mm, by adjusting magnet 35, the full scale span of the flowmeter may be adjusted to 132 mm or more.

In view of the above, it will be seen that the several objects and features of the invention are achieved and other advantageous results attained.

As various changes could be made in the above constructions without departing from the invention, it is intended that all matter contained in the above description or shown in the accompanying drawings shall be interpreted as illustrative and not in a limiting sense.

I claim:

1. In a rotameter-type flowmeter having a flow passage through which flows the fluid whose flow rate is to be measured, a float disposed within said flow passage and axially movable therein along a predetermined path in response to the rate of flow of said fluid through said flow passage, a float magnet operatively adapted to said float and movable in response to a change in flow rate, a follower magnet proximate to and magnetically coupled with said float magnet, said follower magnet being rotatable about an axis in response to movement of said float magnet along its path, and indicator means operable by said follower magnet upon rotation thereof, wherein said improvement comprises: a calibration magnet disposed proximate said follower magnet so that the magnetic flux of said calibration magnet has a substantial effect on the movement of said follower magnet in response to movement of said float magnet, the effect of said calibration magnet on said follower magnet being dependent upon the relative position between said calibration magnet and said follower magnet, said calibration magnet being selectively movable along a predetermined path in a plane generally perpendicular to and equidistant from the axis of rotation of said follower so as to permit adjustment of the linearity of the flowmeter.

2. In a rotameter-type flowmeter having a flow passage through which flows the fluid whose flow rate is to be measured, a float disposed within said flow passage and axially movable therein along a predetermined path in response to the rate of flow of said fluid through said flow passage, a float magnet operatively adapted to said float and movable in response to a change in flow rate, a follower magnet proximate to and magnetically coupled with said float magnet, said follower magnet being rotatable about an axis in response to movement of said float magnet along its path, and indicator means operable by said follower magnet upon rotation thereof, wherein said improvement comprises: a calibration magnet disposed proximate said follower magnet so that the magnetic flux of said calibration magnet has a substantial effect on the movement of said follower magnet in response to movement of said float magnet, the effect of said calibration magnet on said follower magnet being dependent upon the relative position between said calibration magnet and said follower magnet, said calibration magnet being movable along a generally arcuate path in a plane generally perpendicular to the axis of rotation of said follower magnet and substantially coaxial with said rotational axis of said follower magnet so as to permit adjustment of the linearity of the flowmeter.

3. In a rotameter-type flowmeter having a flow passage through which flows the fluid whose flow rate is to be measured, a float disposed within said flow passage and axially movable therein along a predetermined path in response to the rate of flow of said fluid through said flow passage, a float magnet operatively adapted to said float and movable in response to a change in flow rate, a follower magnet proximate to and magnetically coupled with said float magnet, said follower magnet being rotatable about an axis in response to movement of said float magnet along its path, and indicator means operable by said follower magnet upon rotation thereof, wherein said improvement comprises: a calibration magnet disposed proximate said follower magnet so that the magnetic flux of said calibration magnet has a substantial effect on the movement of said follower magnet in response to movement of said float magnet, the effect of said calibration magnet on said follower magnet being dependent upon the relative position between said calibration magnet and said follower magnet, said calibration magnet being selectively movable along a predetermined path in a plan generally perpendicular to and equidistant from the axis of rotation of said follower magnet so as to permit adjustment of the linearity of the flowmeter said follower having a shaft secured thereto, the longitudinal axis of said shaft constituting said axis of rotation of said follower magnet, said flowmeter further comprising a plate disposed generally perpendicular to said shaft, said plate having an arcuate slot therein, said slot having its center of curvature generally coincident with the axis of said shaft, said calibration magnet being operably movable in said slot relative to said follower magnet.

4. In a rotameter-type flowmeter as set forth in claim 3 further including means for locking said calibration magnet in a desired position at any point along its path.

5. In a rotameter-type flowmeter as set forth in claim 4 wherein said locking means comprises clamp means carried by said calibration magnet and clampingly engageable with said plate.

6. In a rotameter-type flowmeter having a flow passage through which flows the fluid whose flow rate is to be measured, a float disposed within said flow passage and axially movable therein along a predetermined path in response to the rate of flow of said fluid through said flow passage, a float magnet operatively adapted to said float and movable in response to a change in flow rate, a follower magnet proximate to and magnetically coupled with said float magnet, said follower magnet being rotatable about an axis in response to movement of said float magnet along its path, and indicator means operable by said follower magnet upon rotation thereof, wherein said improvement comprises: a calibration magnet disposed proximate said follower magnet so that the magnetic flux of said calibration magnet has a substantial effect on the movement of said follower magnet in response to movement of said float magnet, the effect of said calibration magnet on said follower magnet being dependent upon the relative position between said calibration magnet and said follower magnet, said calibration magnet being selectively movable along a predetermined path in a plane generally perpendicular to and equidistant from the axis of rotation of said follower magnet so as to permit adjustment of the linearity of the flowmeter, said flowmeter further comprising a plate generally perpendicular to the axis of rotation of said follower magnet, an arcuate slot in said plate, said arcuate slot having its center of curvature generally coincident with the rotational axis of said follower magnet, a holder slidably received in said slot and movable therealong, said holder threadably receiving said calibration magnet whereby upon threading said calibration magnet, the latter may be selectively moved toward or away from said follower magnet to adjust the full-scale span of the flowmeter.

7. In a rotameter-type flowmeter having a flow passage through which flows the fluid whose flow rate is to be measured, a float disposed within said flow passage and axially movable therein along a predetermined path in response to the rate of flow of said fluid through said flow passage, a float magnet operatively adapted to said float and movable in response to a change in flow rate, a follower magnet proximate to and magnetically coupled with said float magnet, said follower magnet being rotatable about an axis in response to movement of said float magnet along its path, and indicator means operable by said follower magnet upon rotation thereof, wherein said improvement comprises a calibration magnet disposed proximate said follower magnet so that the magnetic flux of said calibration magnet has a substantial effect on the movement of said follower magnet in response to movement of said float magnet, the effect of said calibration magnet on said follower magnet being dependent upon the relative position between said calibration magnet and said follower magnet, said calibration magnet being selectively movable along a line generally parallel to the axis of rotation of said follower magnet toward or away from said follower magnet thereby to selectively adjust the full-scale span of the flowmeter.

* * * * *